Sept. 8, 1959 F. G. DANNER ET AL 2,903,607

FLIP-FLOP RESETTING CIRCUIT

Filed April 29, 1957

INVENTORS
FREDERICK GEORGE DANNER
GENE C. BROWNE
BY
[signature]
ATTORNEY 2,903,607
Patented Sept. 8, 1959

2,903,607

FLIP-FLOP RESETTING CIRCUIT

Frederick George Danner, Glen Oaks, and Gene C. Browne, North Amityville, N.Y., assignors to Sperry Rand Corporation, Great Neck, N.Y., a corporation of Delaware Application April 29, 1957, Serial No. 655,766

7 Claims. (Cl. 307—88.5)

Figure 1:
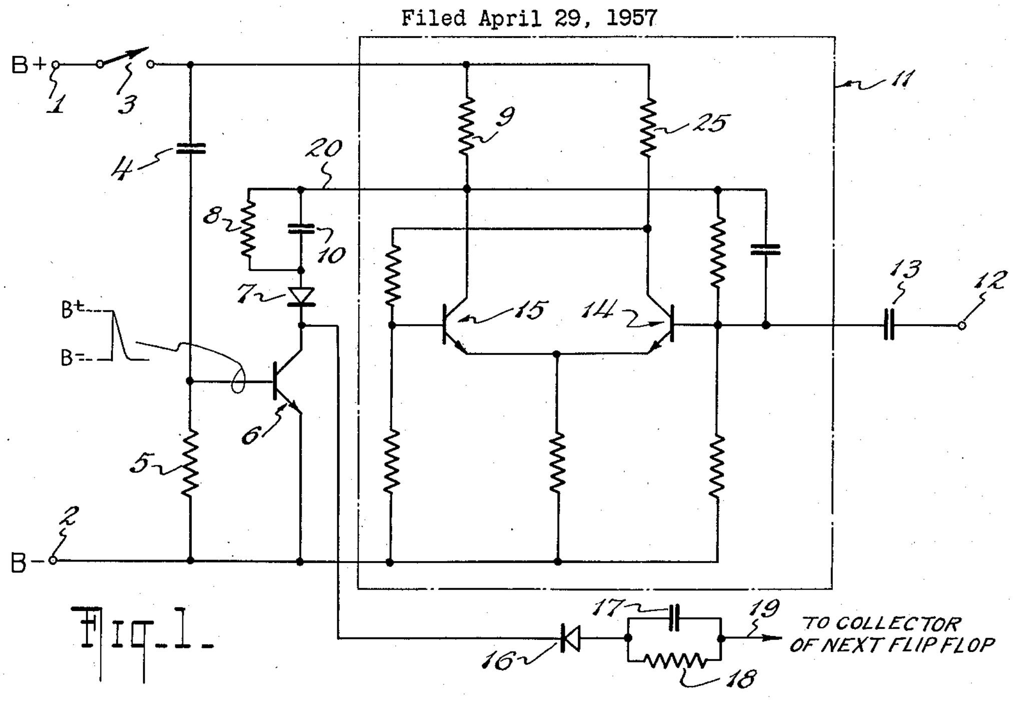

The invention generally relates to flip-flop circuits, and more particularly, to means for automatically setting the initial state of a bistable flip-flop at the time when the flip-flop is first energized.

The utility of a flip-flop circuit, for example, as a basic computing element and as a waveform generator has long been recognized. One of the problems associated with the use of bistable flip-flop circuits for such purposes is to provide means for establishing a predetermined state of the flip-flop at a particular time. Such means, shown in the prior art, includes the use of resetting pulses. However, when it is only desired that the flip-flops be placed into some original state, at the time of energizing the flip-flops, it is not necessary that a separate source of resetting pulses be provided. More simply, techniques have been devised for either designing some degree of unbalance into the flip-flop whereby it will initially assume a predetermined state but still respond to subsequently applied triggers, or for providing external means for initially unbalancing the flip-flop, which external means are rendered inoperative after the flip-flop has assumed its predetermined state so that the later operational mode of the flip-flop remains undisturbed.

In the case of vacuum tube flip-flops, such as a bistable multivibrator, the degree of inherent unbalance required to induce an initial predetermined state is relatively small. On the other hand, however, experience has shown that the degree of unbalance required in transistorized flip-flops is prohibitively greater to insure reliable presetting; that is, the characteristics of commercially available transistors have not yet achieved the relatively high degree of uniformity that obtains with vacuum tubes. Hence, more positive means for initially unbalancing a transistorized flip-flop circuit is required than is the case with vacuum tube circuits so that means external to the flip-flop per se must be resorted to.

It is the general object of the present invention to provide automatic means for initially setting a flip-flop into a predetermined state.

Another object is to provide means which are operative only during the period of initial energization of a flip-flop to establish a predetermined state of conduction.

A further object is to provide automatic initial state-setting means for flip-flops which produces no adverse effect on the operation of the flip-flops subsequent to said initial state-setting.

These and other objects of the present invention, as will be seen more clearly from the following descripiton, are achieved in an illustrative embodiment by the provision of a bistable transistorized flip-flop circuit and a control transistor. The control transistor is placed in shunt with two electrodes of that transistor of the flip-flop which is desired to be rendered initially conductive, hereinafter termed the On transistor. The control transistor is rendered conductive by a transient current produced at the time that the transistorized flip-flop is first energized.

Assuming, for example, that the collector of the control transistor is connected to the collector of the On transistor of the flip-flop, the conduction of the control transistor lowers the collector potential of the On transistor thus establishing an initial voltage unbalance between the collectors of the two transistors comprising the flip-flop. This voltage unbalance sets into motion the well known regenerative action of the flip-flop, whereby the potential on the collector of the On transistor is further lowered and the flip-flop assumes a condition wherein the On transistor is rendered coductive and the other transistor comprising the flip-flop is cut off.

Means including a condenser are provided to couple a transient flow of current to the base of the control transistor when the flip-flop is first energized to render the control transistor conductive. The action of the conducting control transistor to lower the collector potential of the On transistor persists until said base condenser is fully charged. At that time, the control transistor is rendered non-conductive and effectively remains out of the flip-flop circuit for the remainder of the time that the flip-flop continues to be energized.

Figure 2:
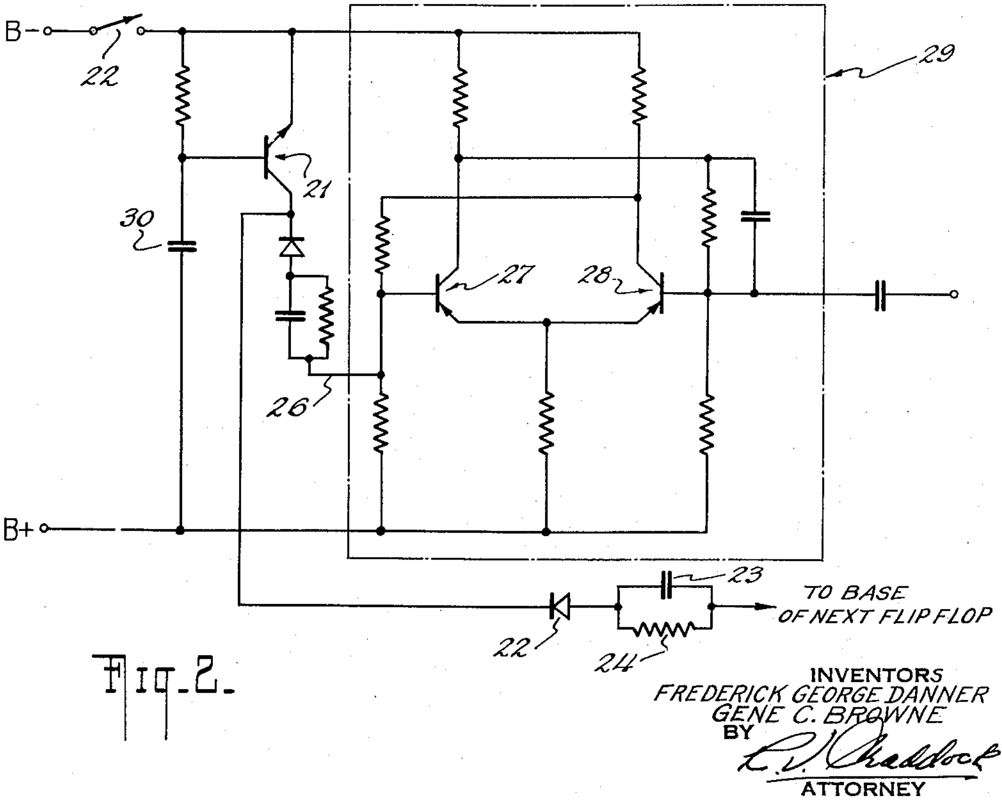

For a more complete understanding of the present invention, reference should be had to the following specification and the appended drawings wherein:

Fig. 1 is a schematic drawing of the automatic initial setting means of the present invention when operating on the collector of one of the transistors comprising a flip-flop; and Fig. 2 is a schematic drawing of the automatic initial setting means of the present invention when operating on the base of one of the transistors comprising a flip-flop.

In Fig. 1, a source of D.C. potential is applied across terminals 1 and 2, making terminal 1 positive relative to terminal 2. Switch 3, when closed, applies energizing potentials to the circuit elements. A capacitor 4 and resistor 5 are connected in series across terminals 1 and 2 when switch 3 is closed, permitting a transient current flow during the time that capacitor 4 is charging. The transient current produces a positive-going pulse across resistor 5, which pulse is applied between the base and emitter electrodes of control transistor 6. The collector potential for transistor 6 is derived from terminal 1 via the series conductive path provided by diode 7, resistor 8, and resistor 9. A capacitor 10 is connected across resistor 8. Diode 7 is poled to permit only normal-direction collector current flow within transistor 6, i.e., the flow of reverse current between the collector and base is inhibited.

A conventional emitter-coupled bistable multivibrator utilizing NPN transistors is generally represented by the numeral 11. Triggering pulses for multivibrator 11, when applied to terminal 12, are coupled via capacitor 13 to the base of transistor 14.

In operation, when switch 3 is closed, the positive-going pulse, produced across resistor 5, renders control transistor 6 conductive, permitting the flow of collector current through diode 7 and the parallel combination of resistor 8 and condenser 10. The flow of collector current from transistor 6 through resistor 9 causes the potential at the collector of transistor 15 to fall.

As previously mentioned, energizing potentials are applied to the circuit elements of Fig. 1 when switch 3 is closed. These potentials are simpultaneously applied to the collectors of transistors 15 and 14 via resistors 9 and 25, respectively, with the potential of the collector of transistor 14 rising more rapidly than the collector potential of transistor 15 because of the flow of collector current from the control transistor 6 through the collector load resistor 9 of transistor 15. There is thus originated a potential differential between the collectors of transistors 15 and 14, which differential sets into motion the well known regenerative operation characteristic of flip-flops such as flip-flop 11. As a result of the regenerative action, a stable condition will be reached wherein transistor 15 is conducting and transistor 14 is cut off.

The initial flow of collector current from control transistor 6 is quickly passed by condenser 10 thus providing a high transient surge of current on line 20 to abruptly depress the collector potential of transistor 15. Condenser 10 is rapidly charged but the flow of collector current from transistor 6 is maintained, although to a lower degree, by the shunt path provided by resistor 8. In this way, the collector potential of transistor 15 is kept at a lowered value, insuring resetting, until transistor 6 ceases to conduct. Transistor 6 is rendered nonconductive when condenser 4 becomes fully charged, at which time the potential of the base of transistor 6 falls to the same potential as that of its emitter. When capacitor 4 is thus fully charged, and transistor 6 is rendered non-conductive, the entire external control circuit connected to flip- flop 11 via line 20 is effectively isolated therefrom, permitting the subsequent normal operation of flip-flop 11.

While the control circuit of Fig. 1 is shown connected to only a single flip-flop, it is readily adaptable for purposes of resetting a plurality of transistorized flip-flop stages without necessitating duplicate control apparatus. That is, a single control transistor, such as transistor 6, may be employed for initially resetting a plurality of transistorized flip-flops by the simple expedient of adding one diode and one parallel combination of a capacitor and a resistor for each flip-flop to be reset. There is shown in Fig. 1 such an additional diode 16 and parallel combination of capacitor 17 and resistor 18 to indicate the supplementary circuit elements required to achieve the simultaneous initial resetting of an additional transistor flip-flop. It is understood that line 19 will be connected to the collector of one of the transistors comprising the additional flip-flop stage in the same manner as the corresponding line 20 is connected to the collector of transistor 15. It will be observed that the collectors of the successive transistor flip-flop stages are effectively isolated from each other by back-to-back connected diodes, such as diode 7 and diode 16. Thus, the initial resetting apparatus of the present invention may be used with one or more transistorized flip-flops while producing no adverse effect during the subsequent normal operational mode of each flip-flop. At the same time, a minimum amount of circuit elements is required in order to adapt the present invention for resetting a plurality of flip-flops.

It will be clear that resetting techniques alternative to that shown in Fig. 1 will include the application of a control current to the base of one of the transistors comprising the flip-flop rather than to its collector. Such an alternative arrangement is shown in Fig. 2 wherein the control curent flowing in line 26, corresponding to line 20, of Fig. 1 is applied to the base of PNP transistor 27. It will be observed that the control transistor circuit of Fig. 2 corresponds precisely to that of Fig. 1 and the same negative-going potential will be produced on line 26 as was produced on line 20 of Fig. 1 during the flow of collector current from the control transistor.

As is well known, the application of a negative-going potential to the collector of a type NPN resistor (such as transistor 15 of Fig. 1) is similar in effect to the application of a negative-going potential to the base of a type PNP transistor (such as transistor 27 of Fig. 2) insofar as the resetting of the respective transistor flip-flops is concerned. Upon the application of a negative-going voltage to the base of transistor 27, included within conventional flip-flop 29, the flow of collector current will increase, thus lowering its collector potential. The lowering of the potential of the collector of transistor 27, relative to the potential of the collector of transistor 28, originates the regenerative action of flip-flop 29 whereby a stable condition is reached, with transistor 27 being rendered conductive and transistor 28 being cut off. As is the case with transistor 6 of Fig. 1, control transistor 21 will be cut off when condenser 30 is fully charged thereby isolating the control circuit from flip-flop 29 to permit subsequent normal flip-flop operation.

It will be recognized that the alternative technique of Fig. 2, of applying the control signal to the base of the controlled flip-flop transistor 27 rather than to the collector thereof, carries with it the advantage of benefiting by the gain of the controlled transistor. Thus, a smaller amplitude control signal need be generated by control transistor 21 of Fig. 2 than is required of control transistor 6 of Fig. 1. As is the case with Fig. 1 the control circuit of Fig. 2 is likewise readily adapted for the initial resetting of a plurality of transistorized flip-flops as is suggested by diode 22 and the parallel combination of capacitor 23 and resistor 24.

It will be seen from the preceding specification that the objects of the present invention have been achieved in illustrative embodiments by the provision of an automatic control circuit for transistorized flip-flops whereby the flip-flop is placed into a predetermined state immediately upon the application of energizing potentials. The automatic control circuit comprises an electronic switch which may be in the form of a transistor which is rendered conductive upon the application of said energizing potential and remains conductive for a period of time until a capacitor, through which the base control current is derived, is fully charged. When the capacitor is so charged, the potential between the base and emitter of the control transistor is reduced to zero, rendering it non-conductive.

During the flow of control transistor current in one illustrative embodiment, the potential of the collector at one of the transistors comprising the flip-flop is reduced, causing the flip-flop to assume a predetermined state. Upon the cessation of current flow in the control transistor, the control circuit elements are effectively isolated from the flip-flop, thus permitting subsequent normal operation thereof. The invention also provides for the resetting of a plurality of transistorized flip-flop elements.

It will be recognized that although the present invention is particularly suited to the resetting of transistorized flip-flops, because of its capacity to produce the requisite substantial initial unbalance, it may be readily adapted to other devices such as vacuum tube multivibrators.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A bistable circuit adapted to be set initially into a predetermined state upon the application of a D.C. energizing potential, said circuit comprising switching means having a control input, signal coupling means including a condenser, and a flip-flop, said flip-flop being connected to said source and having a pair of control terminals for setting said flip-flop into a predetermined state upon the establishment thereacross of a control current path, said switching means being connected across said terminals and forming said path when said switching means is rendered conductive and disrupting said path when said switching means is rendered non-conductive, said control input of said switching means being coupled to receive said energizing potential by said coupling means, and operative to conduct in response thereto to permit the flow of current in said path, said switching means being rendered non-conductive when said condenser is fully charged.

2. Apparatus as defined in claim 1 wherein said switching means comprises a transistor having at least a base, emitter, and collector electrode, said emitter being connected to one of said pair of control terminals, said base corresponding to said control input, and means for connecting said collector to the other of said pair of control terminals.

3. Apparatus as defined in claim 2 wherein said means for connecting comprises unidirectional impedance means, said impedance means being poled to inhibit the flow of reverse current through said collector.

4. In combination with at least one transistorized flip-flop, each said transistorized flip-flop including one transistor to be rendered conductive in accordance with a desired initial condition, means for establishing said desired initial condition, said means comprising a control transistor havng at least a base, emitter, and collector electrode, the collector of said control transistor being connected to the collector of each said one transistor by respective coupling means, means for applying a D.C. energizing potential jointly to the collector of each said one transistor and each said coupling means associated therewith, and connecting means including a condenser for applying said energizing potential to said base and emitter of said control transistor.

5. In combination with at least one transistorized flip-flop, each said transistorized flip-flop including one transistor to be rendered conductive in accordance with a desired initial condition, means for establishing said desired initial condition, said means comprising a control transistor having at least a base, emitter, and collector electrode, the collector of said control transistor being connected to the collector of each said one transistor by respective coupling means, each said coupling means including a unidirectional impedance device, said impedance device being connected in series between the collector of said control transistor and the collector of said one transistor and adapted to pass the normal collector current of said control transistor, means for applying a D.C. energizing potential jointly to the collector of each said one transistor and each said coupling means associated therewith, and connecting means including a condenser for applying said energizing potential to said base and emitter of said control transistor.

6. In combination with at least one transistorized flip-flop, each said transistorized flip-flop including one transistor to be rendered conductive in accordance with a desired initial condition, means for establishing said desired initial condition, said means comprising a control transistor havng at least a base, emitter, and collector electrode, the collector of said control transistor being connected to the base of each said one transistor by respective coupling means, means for applying D.C. energizing potential jointly to the base of each said one transistor and each said coupling means associated therewith, and connecting means including a condenser for applying said energizing potential to said base and emitter and said control transistor.

7. In combination with at least one transistorized flip-flop, each said transistorized flip-flop including one transistor to be rendered conductive in accordance with a desired initial condition, means for establishing said desired initial condition, said means comprising a control transistor having at least a base, emitter, and collector electrode, the collector of said control transistor being connected to the base of each said one transistor by respective coupling means, each said coupling means including a unidirectional impedance device, said impedance device being connected in series between the collector of said control transistor and the base of said one transistor and adapted to pass the normal collector current of said control transistor, means for applying D.C. energizing potential jointly to the base of each said one transistor and each said coupling means associated therewith, and connecting means including a condenser for applying said energizing potential to said base and emitter and said control transistor.

References Cited in the file of this patent

UNITED STATES PATENTS

| | | |
|---|---|---|
| 2,549,336 | Mohr | Apr. 29, 1952 |
| 2,628,346 | Burkhart | Feb. 10, 1953 |
| 2,761,968 | Kuder | Sept. 4, 1956 |
| 2,764,678 | Craib | Sept. 25, 1956 |